Patented Jan. 28, 1941

2,230,120

UNITED STATES PATENT OFFICE 2,230,120

ESTERS OF PHOSPHORUS ACIDS

Walter Dempsey Paist, Newark, N. J., assignor to Celluloid Corporation, a corporation of New Jersey No Drawing. Application November 19, 1936, Serial No. 111,677

8 Claims. (Cl. 260—461)

This invention relates to acetonyl or other ketonyl esters of phosphorus-containing acids.

An object of my invention is to prepare acetonyl or other ketonyl esters of phosphorus acids. A further object of my invention is to prepare compositions, such as plastic or liquid coating compositions and particularly molding compositions, containing derivatives of cellulose wherein an acetonyl or other ketonyl ester of a phosphorus acid is employed as a plasticizer. Other objects of my invention will appear from the following detailed description.

While certain esters of phosphoric acid such as tricresyl phosphate and triphenyl phosphate have been used as fire retardants and softening agents in cellulose derivative plastics, their use in relatively large quantities in such cellulose derivative plastics is prevented because of their relatively low, and in some cases no, solvent power for the cellulose derivative.

I have found that acetonyl or other ketonyl esters of phosphorus acids are capable of forming solutions with derivatives of cellulose and are excellent solvents, swelling agents, plasticizers, softening agents, or camphor substitutes for use in conjunction with derivatives of cellulose to impart softness, pliability and other desirable properties to plastics, films, textiles, and other materials containing derivatives of cellulose. They act as strong fire retardants and can be used to impart greater fire resistant properties to cellulose derivative plastics than the aryl phosphates because of the fact that it is possible to employ them in larger amounts.

These acetonyl or other ketonyl esters of phosphorus acids dissolve cellulose derivatives at relatively low temperatures and also at a relatively high rate. Moreover they are relatively non-volatile, and do not tend to evaporate readily even at relatively high temperatures. These properties render them particularly useful as plasticizers for cellulose derivative molding compositions that are molded under heat and pressure, particularly by the extrusion or injection molding process where the composition is heated and extruded or injected into a closed mold, since their high solvent power for the cellulose derivative permits ready solutioning under the conditions prevailing, and yet they do not tend to volatilize appreciably at the elevated temperatures prevailing during molding as to cause brittleness in the final molded product.

In accordance with my invention, then, I prepare acetonyl or other ketonyl esters of phosphorus acids and further in accordance with my invention, I prepare compositions containing derivatives of cellulose and such acetonyl or other ketonyl esters of phosphorus acids as plasticizer or softening agent.

The ester made and employed in accordance with this is an ester of a phosphorus acid with an acetonyl group, $CH_3COCH_2$- or any other suitable ketonyl group; that is a group corresponding to a ketone such as diethyl ketone, methyl ethyl ketone minus one hydrogen atom. Examples of phosphorus acids that may be employed in making the esters are ortho phosphorus acid, $H_3PO_3$, and ortho phosphoric acid, $H_3PO_4$. The esters of diacetone alcohol

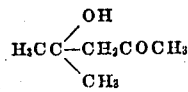

are also included in this invention.

One or more of the hydrogen atoms of the phosphorus acid may be replaced by the acetonyl or other ketonyl group, while any remaining hydrogens may be replaced by any other desired groups such as methyl, ethyl, propyl, isopropyl, butyl, isobutyl, secondary butyl, normal amyl, secondary amyl, or other alkyl group, the residues of simple or poly glycols or their partial ethers and esters, such as mono methyl glycol-(methoxy ethyl-), mono ethyl diethylene glycol, aromatic groups, such as phenyl, cresyl, xylenyl, benzyl, phenoxy ethyl, etc.

Examples of the various acetonyl or other ketonyl esters that may be made in accordance with my invention are triacetonyl phosphate $(CH_3COCH_2)_3PO_4$, diacetonyl butyl phosphate,

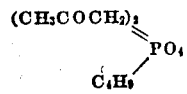

and mono-acetonyl dicresyl phosphate,

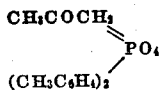

as well as the phosphoric acid (simple or mixed) esters of diacetone alcohol.

Any suitable method may be employed for making the acetonyl or other ketonyl ester of phosphorus acids. Thus the sodium or other alkali metal salt may be reacted with the stoichiometric quantity of acetonyl chloride (mono-chlor-acetone) in the presence or absence of a catalyst such as water. For instance to make triacetonyl phosphate, 3 molecular proportions of acetonyl chloride are reacted with 1 molecular proportion of trisodium phosphate. If diacetonyl phosphate is to be made 2 molecular proportions of acetonyl chloride are reacted with 1 molecular proportion of disodium phosphate. The diacetonyl phosphate may then be reacted with one molecular proportion of butyl alcohol to form diacetonyl butyl phosphate.

Any suitable derivative of cellulose may be employed in conjunction with the acetonyl esters of phosphorus acids, such as cellulose nitrate, but I prefer to employ organic derivatives of cellulose, such as organic esters of cellulose or cellulose ethers. Examples of organic esters of cellulose are cellulose acetate, celluose formate, cellulose propionate and cellulose butyrate, while examples of cellulose ethers are ethyl cellulose, methyl cellulose and benzyl cellulose. There may also be employed mixed cellulose ethers or esters, such as cellulose acetate-nitrate, cellulose acetate-butyrate, or mixtures of cellulose derivatives, such as a mixture of cellulose acetate and cellulose nitrate.

Plastic compositions containing the derivative of cellulose and the acetonyl or other ketonyl esters of phosphorus acids may be made in any suitable manner and they may be worked up into films, sheets, rods, tubes, blocks or any other desired shape.

Molding powder or other compositions containing the derivative of cellulose and the acetonyl or other ketonyl ester of phosphorus acids in intimate association but containing little or no volatile solvent may be made, and these powders may be molded under heat and pressure to any desired shape. As has been previously indicated, the use of such molding powder or other composition in injection or extrusion molding processes, whenever the powder is heated and then forced through a small opening into a closed mold, is particularly important since at the prevailing elevated temperature, the acetonyl or other ketonyl esters of phosphorus acids have a low volatility and a high and rapid solvent action on the cellulose derivative.

Filaments, yarns and other textile materials may be made from solutions containing the organic derivatives of cellulose and the acetonyl or other ketonyl esters of phosphorus acid by extrusion through orifices into an evaporative atmosphere, as in dry spinning, or into a precipitating bath as in wet spinning.

Solutions of the organic derivative of cellulose and the acetonyl or other ketonyl esters of phosphorus acids in a volatile solvent may be cast or extruded onto a smooth surface and the volatile solvent permitted to evaporate to form films that may be used for photographic or other purposes. Another application of this invention is in the preparation of laminated glass wherein a plastic sheet containing the derivative of cellulose and the acetonyl or other ketonyl ester of phosphorus acid is interposed between sheets of glass. Coating compositions such as lacquers may be formed containing the derivative of cellulose and the acetonyl or other ketonyl ester of a phosphorus acid dissolved in appropriate solvent mixtures, and resins, either synthetic or natural, compatible with the derivative of cellulose may be added thereto.

The proportion of the acetonyl or other ketonyl ester of a phosphorus acid to the derivative of cellulose may be varied in accordance with the particular requirements. Generally I have found that in the case of its use with cellulose acetate, the acetonyl or other ketonyl ester of a phosphorus acid may be employed in amounts of 10% or less to 60% or more of the weight of the cellulose acetate.

In making the compositions in accordance with my invention, the acetonyl or other ketonyl ester of a phosphorus acid may be employed as the sole plasticizing agent, or it may be used in conjunction with other plasticizers such as triacetin, triglyceryl propionate, dibenzyl tartrate, diethyl tartrate, dibutyl tartrate, dimethyl phthalate, diethyl phthalate, the phthalate of the mono methyl ether of ethylene glycol, triphenyl phosphate, etc.

In making these compositions, solvents of appropriate nature, such as acetone, methyl acetate, ethylene formal, ethyl lactate, formal glycerol, diacetone alcohol, of varying boiling points may be used to suit the particular requirements. Effect materials such as pigments, filling materials or dyes may be added to produce any desired effect.

It is to be understood that the foregoing detailed description is given merely by way of illustration, and that many variations may be made therein without departing from the spirit of my invention.

Having described my invention, what I desire to secure by Letters Patent is:

1. An ester of phosphorus acid containing the group RCOR$_1$—where R is a lower alkyl group and R$_1$ is a lower alkylene group.
2. An acetonyl ester of a phosphorus acid.
3. An acetonyl phosphate.
4. Triacetonyl phosphate.
5. A mixed acetonyl-alkyl phosphate.
6. A mixed acetonyl-aryl phosphate.
7. Diacetonyl butyl phosphate.
8. Monoacetonyl dicresyl phosphate.

WALTER DEMPSEY PAIST.